US007500534B2

(12) United States Patent
Hommi

(10) Patent No.: US 7,500,534 B2
(45) Date of Patent: Mar. 10, 2009

(54) VEHICLE SLIP CONTROL SYSTEM AND METHOD

(75) Inventor: Akira Hommi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 441 days.

(21) Appl. No.: 10/565,851

(22) PCT Filed: Jul. 26, 2004

(86) PCT No.: PCT/JP2004/011184

§ 371 (c)(1),
(2), (4) Date: Jan. 26, 2006

(87) PCT Pub. No.: WO2005/012026

PCT Pub. Date: Feb. 10, 2005

(65) Prior Publication Data

US 2006/0237244 A1 Oct. 26, 2006

(30) Foreign Application Priority Data

Jul. 30, 2003 (JP) ............................ 2003-203740

(51) Int. Cl.
*B60K 28/16* (2006.01)

(52) U.S. Cl. ....................... 180/197; 180/170; 180/171; 180/172; 180/65.1; 701/71; 701/74; 701/75

(58) Field of Classification Search ................. 903/942; 180/170, 171, 172, 197, 65.1; 701/71, 74, 701/75

See application file for complete search history.

(56) References Cited

U.S. PATENT DOCUMENTS 3,659,263 A * 4/1972 Gunsser et al. ............. 303/168
4,521,856 A * 6/1985 Phelps et al. .................. 701/90
5,159,990 A * 11/1992 Abe et al. ................... 180/197
5,213,177 A * 5/1993 May ........................... 180/197

(Continued)

FOREIGN PATENT DOCUMENTS

DE 101 33 228 A 3/2002

(Continued)

*Primary Examiner*—Christopher P Ellis
*Assistant Examiner*—Jacob Meyer
(74) *Attorney, Agent, or Firm*—Kenyon & Kenyon LLP

(57) ABSTRACT

A vehicle is equipped with a motor that receives a supply of electric power, which is output from a battery and is boosted up by a DC/DC converter circuit, via an inverter circuit and outputs a torque to a drive shaft. In response to an estimated variation in road surface condition based on a decrease in angular acceleration of the drive shaft to be less than a threshold value ref during a slip, the control procedure of the invention adds a predetermined value to a torque upper limit Tmax, which is set at the time of the occurrence of the slip, and thereby updates the torque upper limit Tmax to start cancellation of torque restriction. The control procedure then updates the torque upper limit Tmax by a slope of a small time change to restrain the degree of cancellation of the torque restriction. After elapse of a preset time period specified as a waiting time to stabilize the voltage-increasing operation of the DC/DC converter circuit, the control procedure updates the torque upper limit Tmax by a slope of a greater time change to promptly cancel out the torque restriction.

7 Claims, 15 Drawing Sheets

DRIVE CONTROL ROUTINE
INPUT ACCELERATOR OPENING Acc, VEHICLE SPEED V, AND REVOLUTION SPEED Nm — S100
SET MOTOR TORQUE Tm* Tm*=f1 (Acc, V) — S102
CALCULATE ANGULAR ACCELERATION α α=Nm−Previous Nm — S104
SLIP STATE DETECTION PROCESS — S106
RESULT OF DETECTION? — S108
GRIP
OCCURRENCE OF SLIP
CONVERGENCE OF SLIP
S110 — SLIP OCCURRENCE TIME PROCESSING
SLIP CONVERGENCE TIME PROCESSING — S112
CONTROL MOTOR WITH TORQUE Tm* — S114
RET ANGULAR ACCELERATION α
α1
α slip
0
α ref
α2
MOTOR TORQUE Tm*
β
t1 t2 t3
TIMEt

U.S. PATENT DOCUMENTS

| | | | | |
|---|---|---|---|---|
| 5,373,195 | A | 12/1994 | De Doncker et al. | |
| 5,492,192 | A | 2/1996 | Brooks et al. | |
| 5,737,714 | A * | 4/1998 | Matsuno et al. | 701/89 |
| 5,788,005 | A | 8/1998 | Arai | |
| 6,208,097 | B1 * | 3/2001 | Reddy et al. | 318/52 |
| 6,450,281 | B1 * | 9/2002 | Kohler et al. | 180/197 |
| 6,473,683 | B1 | 10/2002 | Nada | |
| 6,591,925 | B2 | 7/2003 | Raftari et al. | |
| 6,679,346 | B2 | 1/2004 | Raftari et al. | |
| 7,451,847 | B2 * | 11/2008 | Hommi | 180/197 |
| 2001/0032046 | A1 * | 10/2001 | Nada | 701/82 |
| 2001/0054520 | A1 * | 12/2001 | Hosomi et al. | 180/197 |
| 2002/0084127 | A1 * | 7/2002 | Kohler et al. | 180/197 |
| 2002/0145401 | A1 | 10/2002 | Sato et al. | |
| 2003/0062868 | A1 | 4/2003 | Mir et al. | |
| 2004/0036434 | A1 | 2/2004 | Chen et al. | |
| 2004/0145338 | A1 | 7/2004 | Nakamura et al. | |
| 2005/0174089 | A1 | 8/2005 | Lin | |

FOREIGN PATENT DOCUMENTS

| | | | |
|---|---|---|---|
| EP | 0 823 348 | A2 | 2/1998 |
| EP | 1 147 937 | A2 | 10/2001 |
| JP | 62-060402 | | 3/1987 |
| JP | 08-214592 | | 8/1996 |
| JP | 10-215505 | | 8/1998 |
| JP | 10-304514 | | 11/1998 |
| JP | 2001-295676 | | 10/2001 |
| JP | 2003-061204 | | 2/2003 |
| JP | 2003-164016 | | 6/2003 |

* cited by examiner

VEHICLE SLIP CONTROL SYSTEM AND METHOD

This is a 371 national phase application of PCT/JP2004/011184 filed 26 Jul. 2004, claiming priority to Japanese Patent Application No. 2003-203740 filed 30 Jul. 2003, the contents of which are incorporated herein by reference.

FIELD OF THE INVENTION

The present invention relates to a technique applied to a vehicle and to a control method of a vehicle.

BACKGROUND OF THE INVENTION

A proposed vehicle detects the occurrence of a slip due to spin of drive wheels when a rate of change in angular velocity (angular acceleration) of the drive wheels is not less than a preset level, and restricts a torque output from a motor to a drive shaft (see, for example, Japanese Patent Laid-Open Gazette No. 10-304514).

SUMMARY OF THE INVENTION

In response to a decrease in angular acceleration by the torque restriction, the prior art vehicle detects convergence of a slip and cancels the restriction of the torque output to the drive shaft. Such cancellation of the torque restriction may, however, cause unstable power supply to the motor. The vehicle is typically equipped with a booster circuit that boosts up the voltage of a secondary battery and outputs a supply of electric power having the increased voltage to the motor. In the event of the occurrence of a slip that converges in a short time period, for example, at the time of running over a step, there is only a short time interval between the restriction of the torque output to the drive shaft and the cancellation of the torque restriction in response to the convergence of the slip. In the case of such an abrupt cancellation of the torque restriction, a delayed voltage increase by the booster circuit fails to output a supply of electric power having a sufficiently increased voltage to the motor. This may cause the flow of excessive current through a power system including the motor.

In order to eliminate such drawbacks of the prior art technique, the vehicle and the vehicle control method of the invention aim to stabilize power supply to a motor in the state of the occurrence of a slip. The vehicle and the vehicle control method of the invention also aim to prevent the flow of excessive current through a power system connecting with the motor in the state of the occurrence of a slip.

In order to attain at least part of the above and the other related objects, the invention is directed to a vehicle and a control method of the vehicle as discussed below.

A vehicle of the invention is driven with output of power to a drive shaft linked with drive wheels, and includes: a voltage converter that converts a voltage of an accumulator into a desired form of voltage; a motor that receives a supply of electric power having the voltage converted by the voltage converter and outputs power to the drive shaft; a slip detection module that detects a slip due to spin of the drive wheels; and a controller that, in response to detection of a slip by the slip detection module, drives and controls the motor to restrict a torque output to the drive shaft with a view to converging the detected slip, and sets an initial torque for starting cancellation of the restriction of the torque output to the drive shaft, based on the restriction of the torque output, the controller driving and controlling the motor, in response to convergence of the detected slip, to apply the setting of the initial torque and thereby cancel the restriction of the torque output to the drive shaft.

In response to detection of a slip due to spin of the drive wheels, the vehicle of the invention drives and controls the motor to restrict the torque output to the drive shaft with a view to converging the detected slip. The vehicle of the invention sets the initial torque for starting cancellation of the restriction of the torque output, based on the restriction of the torque output. In response to convergence of the detected slip, the vehicle of the invention drives and controls the motor to apply the setting of the initial torque and thereby cancel the restriction of the torque output to the drive shaft. The initial torque for starting the torque restriction in response to convergence of a slip is set, based on the restriction of the torque output to the drive shaft at the time of detection of the slip. The control procedure of the invention desirably stabilizes the voltage-converting operation of the voltage converter in the process of canceling the torque restriction, regardless of the degree of the torque restriction. The stable voltage conversion ensures stable power supply to the motor in the state of the occurrence of a slip.

As one aspect in the vehicle of the invention, the controller may set a resulting torque, which cancels the restriction of the torque output to the drive shaft by a predetermined level, to the initial torque.

As another aspect in the vehicle of the invention, the controller may drive and control the motor to restrain a degree of the cancellation of the torque restriction for a preset time period, after cancellation of the restriction of the torque output to the drive shaft to a level of the initial torque. This arrangement effectively ensures stable power supply to the motor. Further, the controller may drive and control the motor to cancel the restriction of the torque output to the drive shaft by a slope of a first time change until elapse of the preset time period and to cancel the torque restriction by a slope of a second time change, which is greater than the slope of the first time change, after elapse of the preset time period. This enables the stable power supply to the motor to be compatible on some level with prompt cancellation of the restriction of the torque output to the drive shaft in response to convergence of a slip. In these cases, the preset time period may represent a time required to stabilize the voltage-converting operation of the voltage converter.

The vehicle of the invention may further includes an angular acceleration measurement module that measures an angular acceleration of the drive shaft, and the controller may drive and control the motor to restrict the torque output to the drive shaft with a torque restriction value, which is set corresponding to a peak value of the measured angular acceleration in response to detection of a slip by the slip detection module, and sets the initial torque based on the torque restriction value.

Further, in the vehicle of the invention, the controller may carry out control to apply the setting of the initial torque and thereby cancel the restriction of the torque output to the drive shaft, when the slip detected by the slip detection module converges in a short time period. Moreover, the vehicle may include a varying road surface condition estimation module that estimates a variation in road surface condition, and the controller may carry out control to apply the setting of the initial torque and thereby cancel the restriction of the torque output to the drive shaft, in response to estimation of a variation in road surface condition. In these cases, the vehicle may further include an angular acceleration measurement module that measures an angular acceleration of the drive shaft, and the controller may set a second initial torque, which has a greater degree of cancellation of the torque restriction against a smaller value of time integral of the measured angular acceleration of the drive shaft in response to detection of a slip by the slip detection module, in the case of no convergence of the slip in the short time period or in the case of estimation of no variation in road surface condition, while driving and controlling the motor, in response to convergence of the detected slip, to apply the setting of the second initial torque and thereby cancel the restriction of the torque output to the drive shaft. This arrangement enables the torque restriction to be promptly cancelled out in a specific range that prevents the reoccurrence of a slip, in the case of no convergence of a slip in a short time period or in the case of estimation of no variation in road surface condition.

The invention is not restricted to the vehicle having any of the arrangements discussed above, but is also actualized by a control method of such a vehicle.

DETAILED DESCRIPTION

Figure 1:
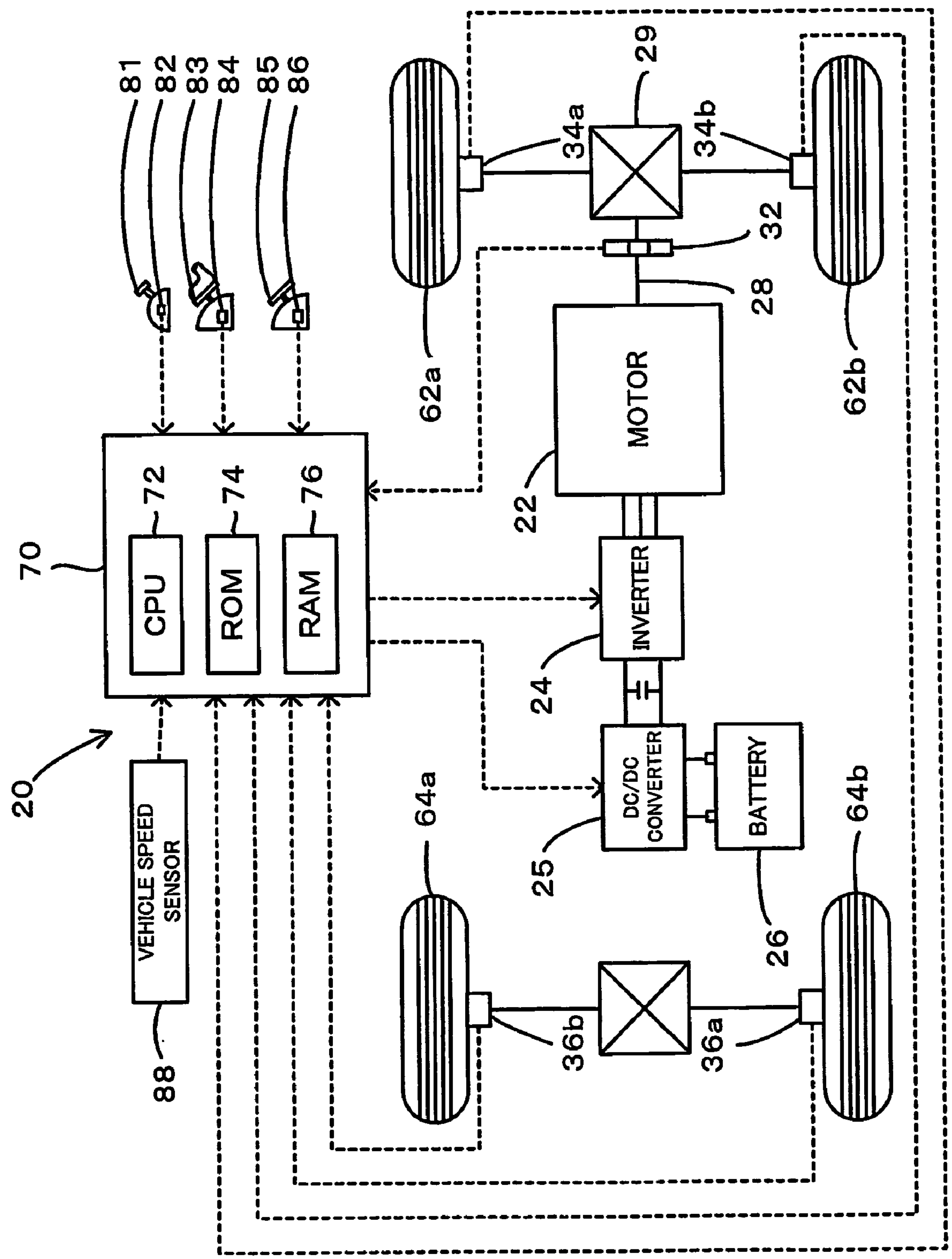
FIG. 1 schematically illustrates the configuration of a vehicle 20 in one embodiment of the invention.

One mode of carrying out the invention is discussed below as a preferred embodiment. FIG. 1 schematically illustrates the configuration of a vehicle 20 in one embodiment of the invention. As illustrated, the vehicle 20 of the embodiment includes a motor 22 that receives a supply of electric power from a battery 26 via a DC/DC converter circuit 25 and an inverter circuit 24 and outputs power to a drive shaft 28, which is mechanically linked with drive wheels 62*a* and 62*b* via a differential gear 29, and a main electronic control unit 70 that controls the whole vehicle.

The motor 22 is a synchronous motor generator functioning as both a motor and a generator. The inverter circuit 24 has multiple switching elements to convert an input of electric power from the battery 26 into an adequate form of electric power for driving the motor 22 and output the converted electric power.

The DC/DC converter circuit 25 functions to boost up the voltage of the battery 26 and to supply the increased voltage to the inverter circuit 24. The DC/DC converter 25 is actuated and controlled by the main electronic control unit 70 to apply a desired level of voltage to (the input terminal of) the inverter circuit 24.

The main electronic control unit 70 is constructed as a microprocessor including a CPU 72, a ROM 74 that stores processing programs, a RAM 76 that temporarily stores data, non-illustrated input and output ports, and a non-illustrated communication port. The main electronic control unit 70 receives, via its input port, various input signals including a rotational position $\theta m$ from a rotational position detection sensor 32 (for example, a resolver) that detects the rotational position of the drive shaft 28 (the rotating shaft of the motor 22), a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The main electronic control unit 70 outputs switching control signals to the switching elements included in the inverter circuit 24 and to the switching elements included in the DC/DC converter circuit 25 via its output port.

Figure 2:
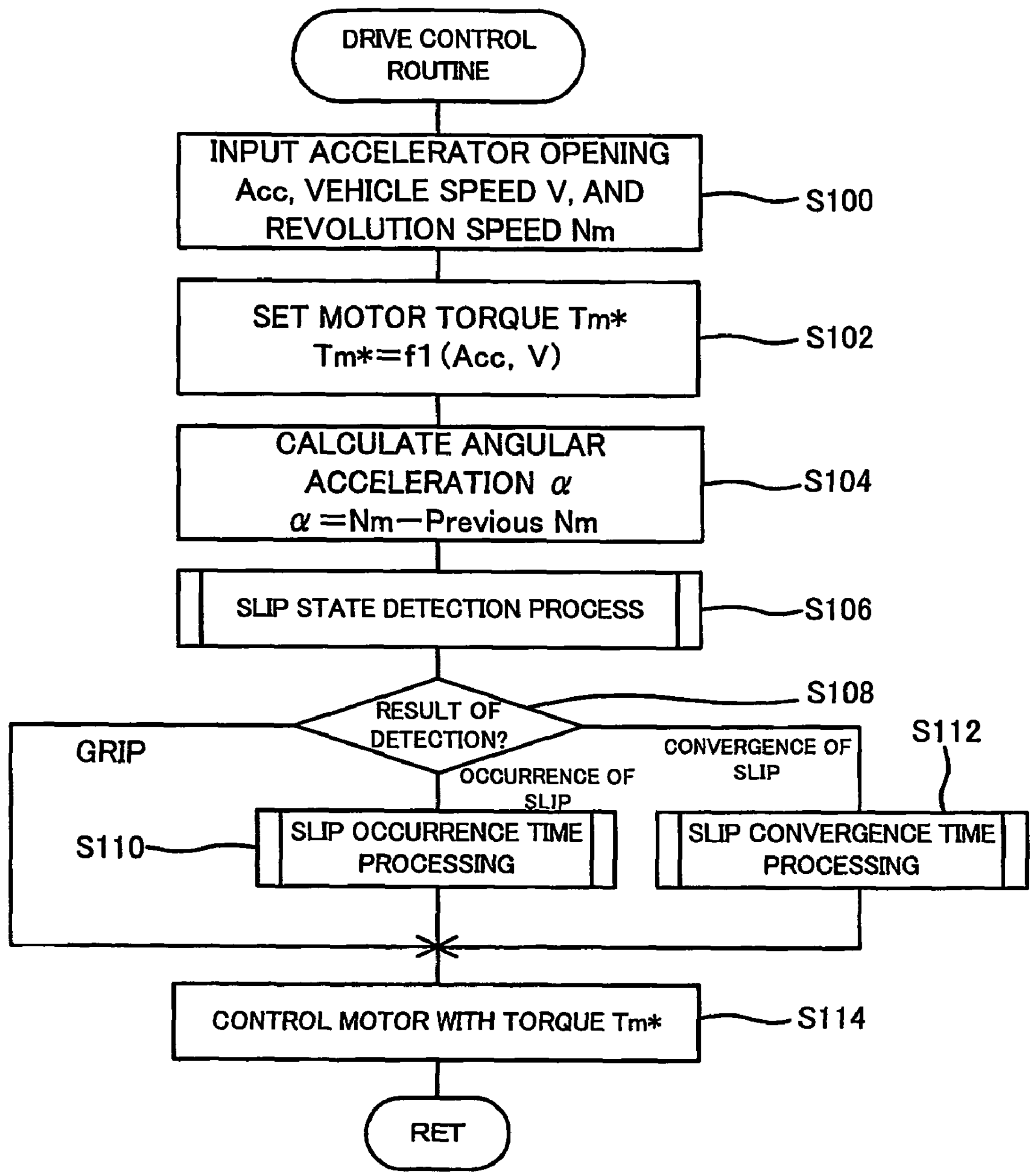
FIG. 2 is a flowchart showing a drive control routine executed by a main electronic control unit 70 in the vehicle 20 of the embodiment.

The following describes the operations of the vehicle 20 of the embodiment constructed as discussed above, especially a series of operations to drive and control the motor 22 in response to detection of the occurrence of a slip due to spin of the drive wheels 62*a* and 62*b*. FIG. 2 is a flowchart showing a drive control routine executed by the main electronic control unit 70 in the vehicle 20 of the embodiment. This routine is carried out repeatedly at preset time intervals (for example, 8 msec).

Figure 3:
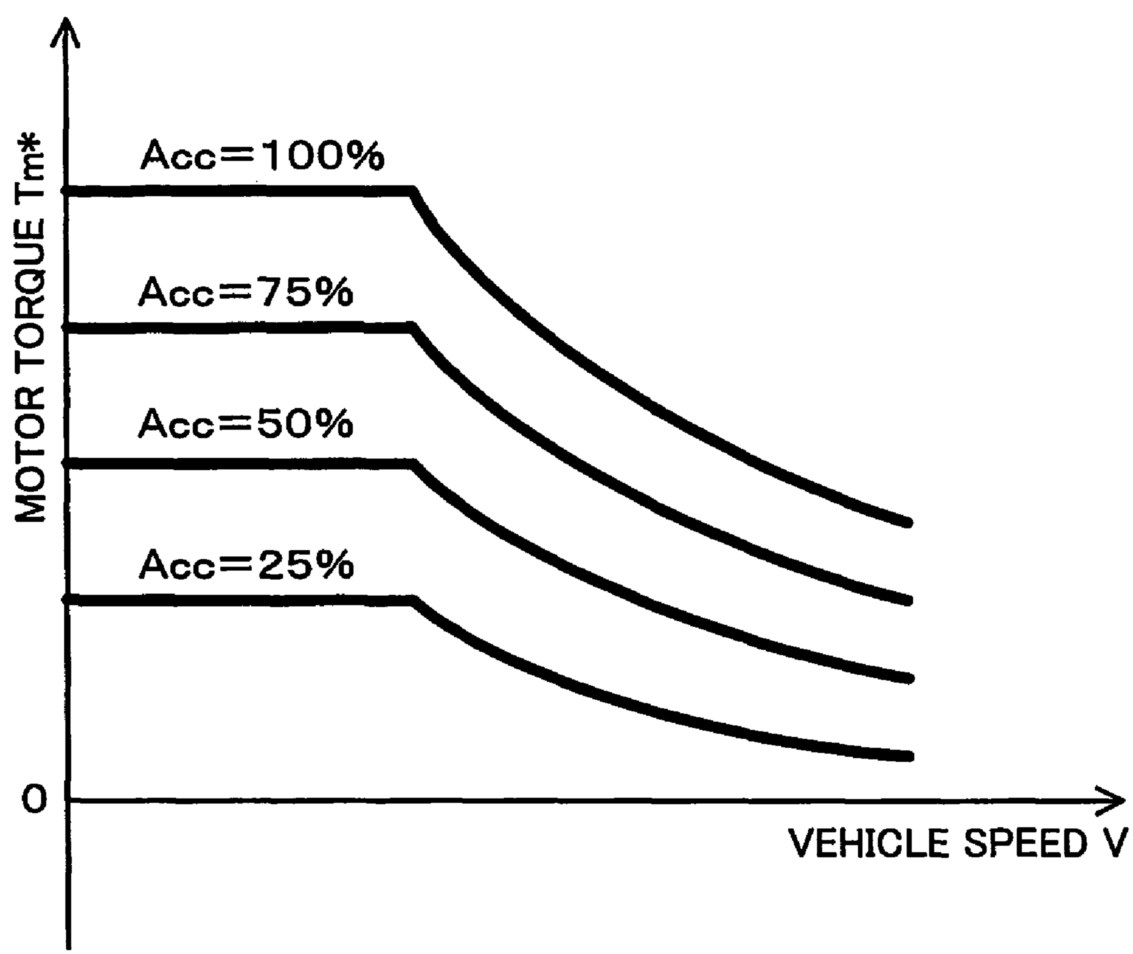
FIG. 3 is a map showing variations in motor torque Tm* against the accelerator opening Acc and the vehicle speed V.

When the drive control routine starts, the CPU 72 of the main electronic control unit 70 first inputs various data required for control, that is, the accelerator opening Acc from the accelerator pedal position sensor 84, the vehicle speed V from the vehicle speed sensor 88, and a revolution speed Nm of the drive shaft 28 computed from the rotational position $\theta m$ detected by the rotational position detection sensor 32 (step S100). The routine then sets a motor torque Tm*, which is to be output from the motor 22 to the drive shaft 28, based on the inputs of the accelerator opening Acc and the vehicle speed V (step S102). In the structure of this embodiment, variations in motor torque Tm* against the accelerator opening Acc and the vehicle speed V are specified in advance and are stored as a map in the ROM 74. The procedure of the embodiment reads and sets the motor torque Tm* corresponding to the given accelerator opening Acc and the given vehicle speed V from the stored map. FIG. 3 shows one example of this map.

The routine subsequently calculates an angular acceleration $\alpha$ of the drive shaft 28 from the inputs of the revolution speed Nm (step S104), and carries out a slip state detection process to detect the state of a slip of the drive wheels 62*a* and 62*b*, based on the calculated angular acceleration α (step S106). In this embodiment, the angular acceleration α is computed by subtracting a previous revolution speed Nm input in the previous cycle of this routine from a current revolution speed Nm input in the current cycle of this routine (current revolution speed Nm−previous revolution speed Nm) The unit of the angular acceleration α in this embodiment is [rpm/8 msec], as the revolution speed Nm is expressed by the revolutions per minute [rpm] and the time interval of execution of this routine is 8 msec. Any other suitable unit may be adopted to express the angular acceleration as a time variation in angular velocity. With a view to reducing a potential error, the angular acceleration α may be the average of current and past data of the angular acceleration calculated in the current and several past cycles (for example, three past cycles) of this routine. The details of the slip state detection process are described below.

Figure 4:
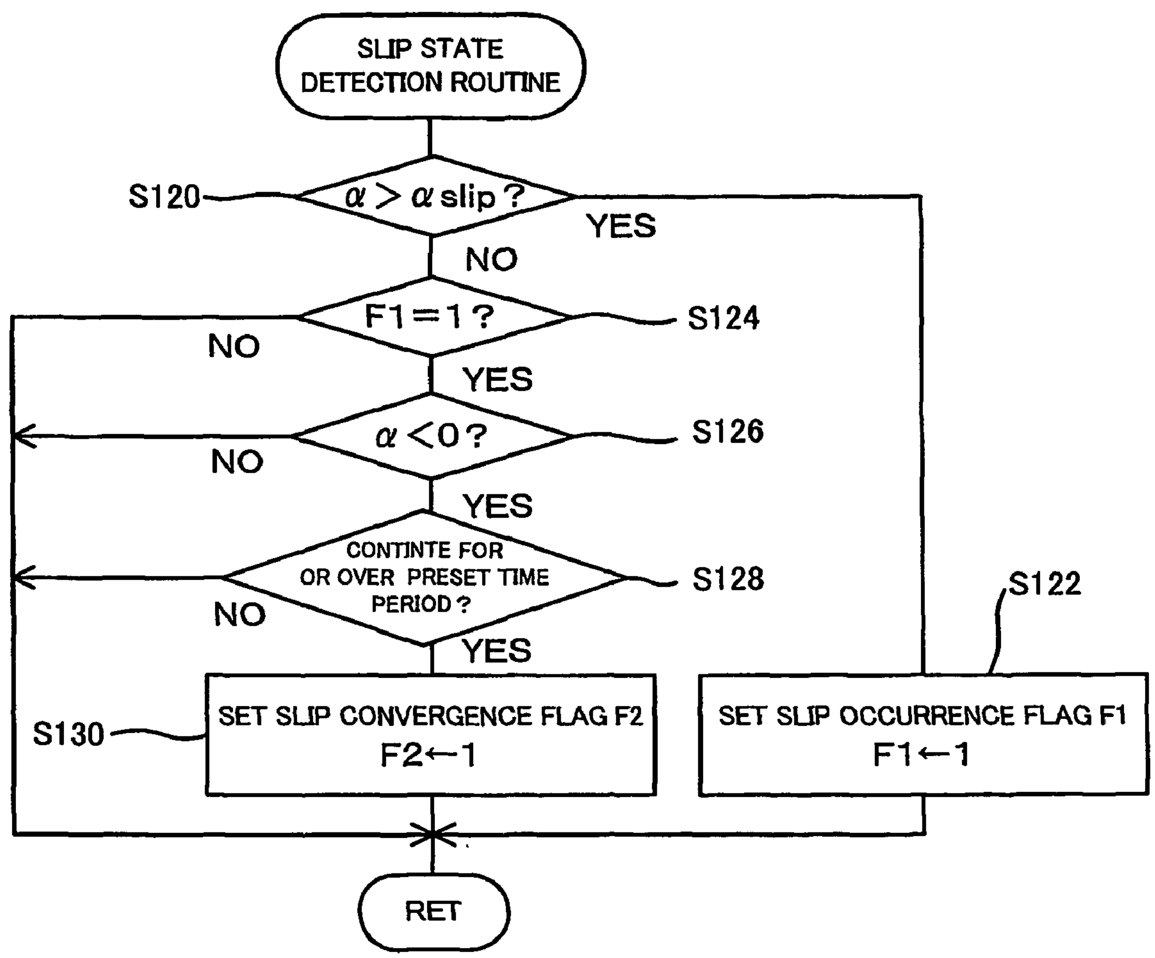
FIG. 4 is a flowchart showing a slip state detection routine executed by the electronic control unit 70 in the vehicle 20 of the embodiment.

FIG. 4 is a flowchart showing a slip state detection routine executed by the main electronic control unit 70 in the vehicle 20 of the embodiment. When the slip state detection routine starts, the CPU 72 of the main electronic control unit 70 first determines whether the angular acceleration α calculated at step S104 in the drive control routine of FIG. 2 exceeds a threshold value αslip, which is used to assume the occurrence of a slip due to the wheelspin (step S120). When it is determined that the calculated angular acceleration α exceeds the threshold value αslip, the routine detects the occurrence of a slip due to the spin of the drive wheels 62*a* and 62*b* and sets the value '1' to a slip occurrence flag F1 representing the occurrence of a slip (step S122). The slip state detection routine is then terminated.

When it is determined that the calculated angular acceleration α does not exceed the threshold value αslip, on the other hand, the routine checks the value of the slip occurrence flag F1 (step S124). When it is determined that the slip occurrence flag F1 is not equal to 1, the slip state detection routine detects no occurrence of a slip but detects a grip state of the drive wheels 62*a* and 62*b*, before being terminated. When it is determined that the slip occurrence flag F1 is equal to 1, on the other hand, the routine successively determines whether the angular acceleration α takes a negative value and whether the negative setting of the angular acceleration α continues for or over a preset time period (steps S126 and S128). When it is determined that the angular acceleration α takes a negative value and that the negative setting of the angular acceleration α continues for or over the preset time period, the routine detects convergence of the slip occurring on the drive wheels 62*a* and 62*b* and sets the value '1' to a slip convergence flag F2 representing the convergence of a slip (step S130). The slip state detection routine is then terminated. When it is determined that the angular acceleration α does not take a negative value or that the negative setting of the angular acceleration α does not continue for or over the preset time period, the slip state detection routine detects no convergence of the slip, before being terminated.

Referring back to the flowchart of FIG. 2, the drive control routine executes a series of processing according to the result of the slip state detection process (steps S108 to S114). In response to detection of no slip (the grip state) where both the slip occurrence flag F1 and the slip convergence flag F2 are equal to 0, the drive control routine drives and control the motor 22 with the motor torque Tm* set at step S102 (step S114) and is terminated. In response to detection of the occurrence of a slip where the slip occurrence flag F1 is equal to 1 and the slip convergence flag F2 is equal to 0, the drive control routine executes a series of slip occurrence time processing (step S110). In response to detection of the convergence of a slip where both the slip occurrence flag F1 and the slip convergence flag F2 are equal to 1, the drive control routine executes a series of slip convergence time processing (step S112). The routine then drives and control the motor 22 with the setting of the motor torque Tm* restricted by each series of processing (step S114) and is terminated. The concrete procedure of driving and controlling the motor 22 outputs the switching control signals to the switching elements of the inverter circuit 24 and to the switching elements of the DC/DC converter circuit 25, in order to output a torque equivalent to the final setting of the motor torque Tm* to the drive shaft 28. The series of slip occurrence time processing and the series of slip convergence time processing are described sequentially below.

Figure 5:
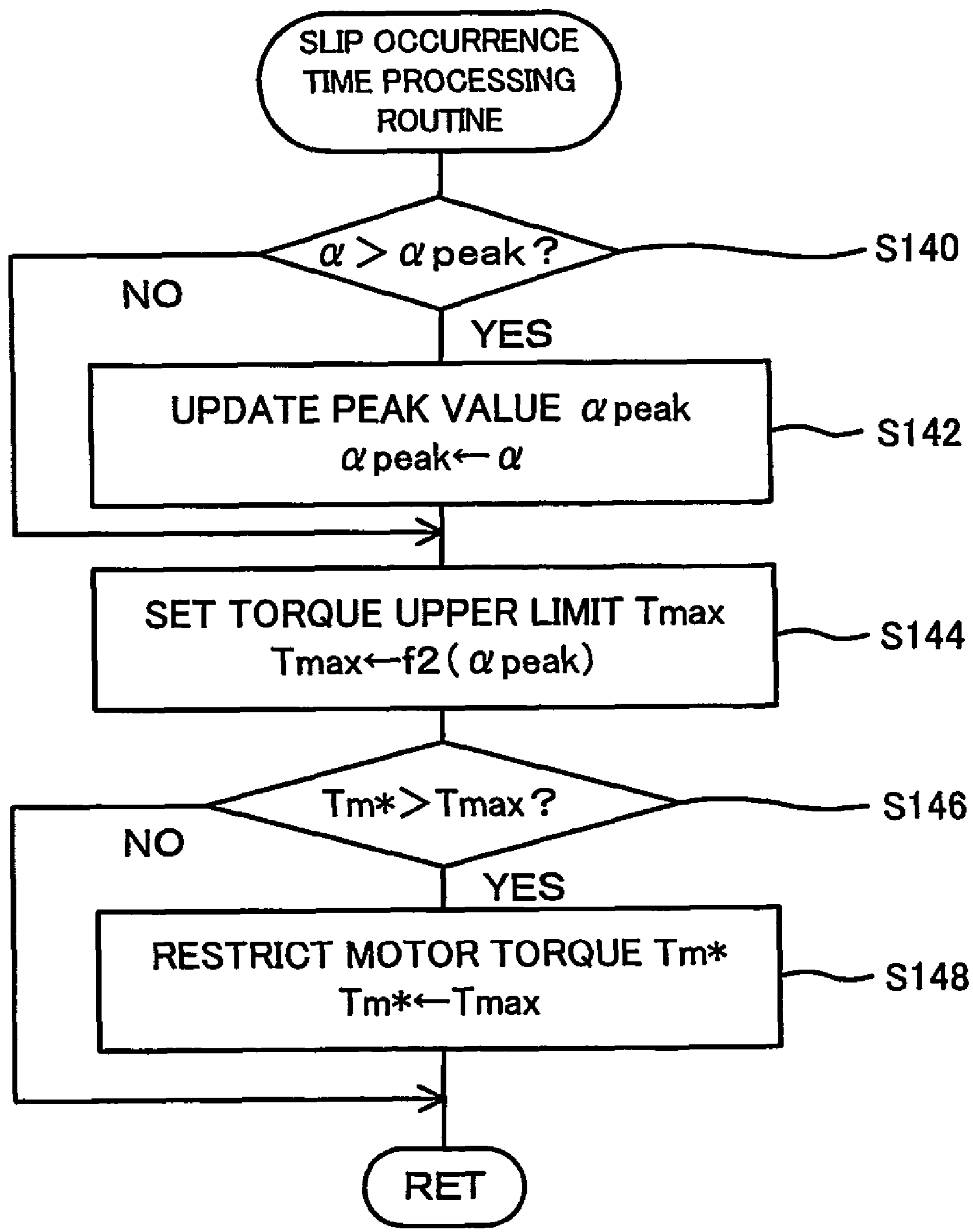
FIG. 5 is a flowchart showing a slip occurrence time processing routine executed by the electronic control unit 70 in the vehicle 20 of the embodiment.
Figure 6:
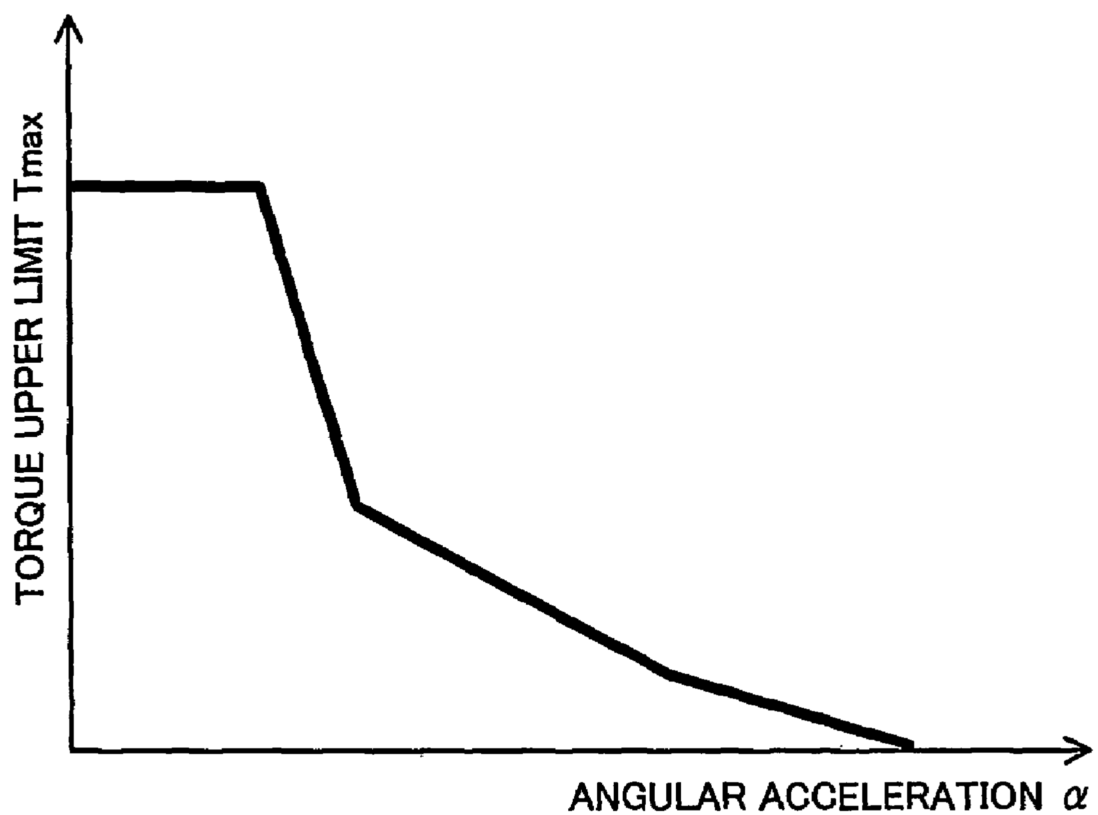
FIG. 6 is a map showing variations in a torque upper limit Tmax against an angular acceleration $\alpha$.

The series of slip occurrence time processing restricts the motor torque Tm* demanded for the drive shaft 28 for the purpose of eliminating a slip and is executed according to a slip occurrence time processing routine shown in the flowchart of FIG. 5. When the slip occurrence time processing routine starts, the CPU 72 of the main electronic control unit 70 first compares the current value of the angular acceleration α calculated at step S104 in the drive control routine of FIG. 2 with a peak value speak (step S140). When the calculated current value of the angular acceleration α exceeds the peak value αpeak, the routine updates the peak value αpeak to the calculated current value of the angular acceleration α (step S142). The peak value αpeak basically represents a peak of the angular acceleration α, which rises in response to the occurrence of a slip, and is set equal to 0 as an initial value. Until the angular acceleration α rises and reaches its peak, the peak value αpeak is successively updated to the latest value of the angular acceleration α. When the angular acceleration α reaches its peak, the peak value αpeak is fixed to the value of the angular acceleration α at the moment. The routine subsequently sets a torque upper limit Tmax, which represents an allowable upper limit of torque output from the motor 22 to eliminate the slip, based on the setting of the peak value αpeak (step S144). The procedure of the embodiment uses a torque upper limit setting map of FIG. 6 showing a variation in torque upper limit Tmax against the angular acceleration α. In the map of this illustrated example, the torque upper limit Tmax decreases with an increase in angular acceleration α. A smaller value is set to the torque upper limit Tmax, as the angular acceleration α rises to increase the peak value αpeak and enhance the degree of a slip. Such setting restricts the output torque from the motor 22. After setting the torque upper limit Tmax, the routine restricts the setting of the motor torque Tm* with the torque upper limit Tmax (steps S146 and S148), before being terminated. This series of processing restricts the output torque from the motor 22 in the event of the occurrence of a slip to a low torque level for eliminating the slip (that is, the torque upper limit Tmax corresponding to the peak value αpeak of the angular acceleration in the map of FIG. 6). This arrangement effectively eliminates the slip.

Figure 7:
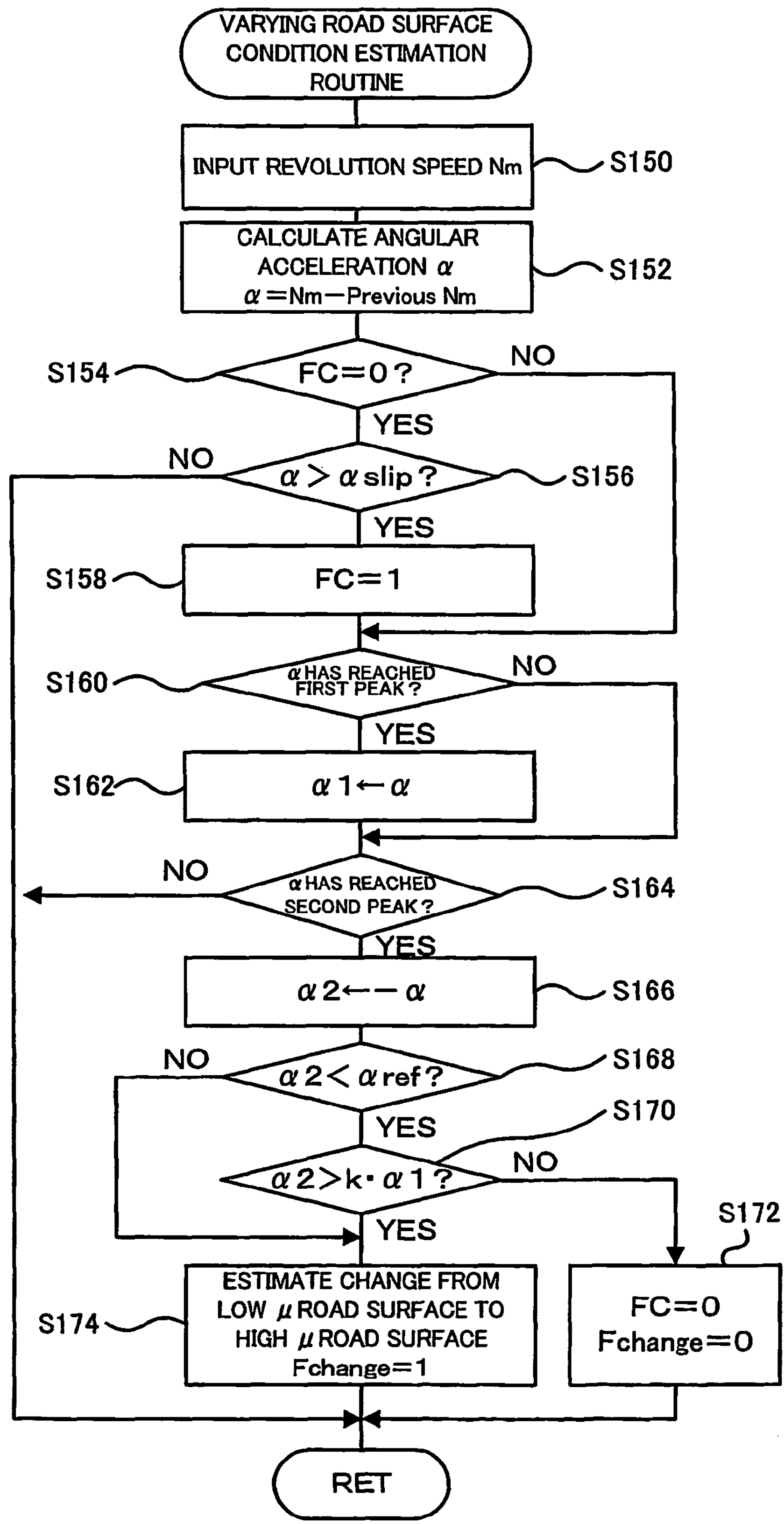
FIG. 7 is a flowchart showing a varying road surface condition estimation routine executed by the electronic control unit 70 in the vehicle 20 of the embodiment.

The series of slip convergence time processing is carried out, based on the result of a varying road surface condition estimation process shown in the flowchart of FIG. 7 to estimate a variation in road surface condition in the event of the occurrence of a slip. The description first regards the varying road surface condition estimation process and then the series of slip convergence time processing. The varying road surface condition estimation routine of FIG. 7 is carried out repeatedly at preset time intervals (for example, at every 8 msec). When the varying road surface condition estimation routine starts, the CPU 72 of the main electronic control unit 70 first receives the revolution speed Nm of the drive shaft 28 computed from the rotational position $\theta m$ detected by the rotational position detection sensor 32 (step S150) and calculates the angular acceleration $\alpha$ of the drive shaft 28 from the inputs of the revolution speed Nm (step S152).

The routine then checks the value of a varying road surface condition detection flag FC (step S154). The varying road surface condition detection flag FC is set equal to '1', which represents fulfillment of a condition for detecting a variation in road surface condition (step S158), when it is determined at step S156 that the angular acceleration $\alpha$ exceeds the threshold value $\alpha$slip, that is, in the event of the occurrence of a slip. In response to the result of determination that the varying road surface condition detection flag FC is equal to 0, the routine compares the calculated angular acceleration $\alpha$ with the threshold value $\alpha$slip (step S156). When the calculated angular acceleration $\alpha$ is not greater than the threshold value $\alpha$slip, this routine is terminated immediately. When the calculated angular acceleration $\alpha$ is greater than the threshold value $\alpha$slip, on the other hand, the routine sets the value '1' to the varying road surface condition detection flag FC (step S158).

After setting the value '1' to the varying road surface condition detection flag FC or in response to determination at step S154 that the varying road surface condition detection flag FC is equal to 1, the routine determines whether the angular acceleration $\alpha$ has reached a first peak (step S160). When the angular acceleration $\alpha$ has reached the first peak, the value of the angular acceleration $\alpha$ at the time is set to a first peak angular acceleration $\alpha$1 (step S162). The first peak of the angular acceleration $\alpha$ represents a variation in time differential of the angular acceleration $\alpha$ from a positive value to a negative value after the angular acceleration $\alpha$ has exceeded the threshold value $\alpha$slip. After setting the first peak angular acceleration $\alpha$1, the routine determines whether the angular acceleration $\alpha$ has reached a second peak (step S164) When the angular acceleration $\alpha$ has reached the second peak, the product of the value of the angular acceleration $\alpha$ at the time and a coefficient '−1' is set to a second peak angular acceleration $\alpha$2 (step S166). The second peak of the angular acceleration $\alpha$ represents a negative peak observed immediately after the first peak. Multiplication of the angular acceleration $\alpha$ by the coefficient '−1' to set the second peak angular acceleration $\alpha$2 makes the sign common to the second peak angular acceleration $\alpha$2 and the first peak angular acceleration $\alpha$1.

After setting the first peak angular acceleration $\alpha$1 and the second peak angular acceleration $\alpha$2, the routine successively compares the second peak angular acceleration $\alpha$2 with a threshold value $\alpha$ref (step S168) and with the product of the first peak angular acceleration $\alpha$1 and a constant 'k' (step S170). The setting of the threshold value $\alpha$ref is greater than an ordinary allowable maximum value set to the first peak angular acceleration $\alpha$1 in the event of the occurrence of a slip due to the wheelspin. For example, in the case where the allowable maximum value set to the first peak angular acceleration $\alpha$1 is equal to 100 [rpm/8 msec] in an experiment of causing a slip of the subject vehicle 20 on a low $\mu$ road surface due to the wheelspin, the threshold value $\alpha$ref may be set equal to 120 or 140. The setting of the constant 'k' is a value of not less than '1', for example, 1.2 or 1.4.

When the second peak angular acceleration $\alpha$2 is less than the threshold value $\alpha$ref and is not greater than the product of the first peak angular acceleration $\alpha$1 and the constant 'k', the varying road surface condition estimation routine estimates no variation in road surface condition and sets the value '0' to both the varying road surface condition detection flag FC and a road surface condition variation flag Fchange (step S172), before being terminated. When the second peak angular acceleration $\alpha$2 is not less than the threshold value $\alpha$ref or when the second peak angular acceleration $\alpha$2 is less than the threshold value $\alpha$ref but is greater than the product of the first peak angular acceleration $\alpha$1 and the constant 'k', the routine estimates a variation in road surface condition, that is, a change from a low $\mu$ road surface to a high $\mu$ road surface, and sets the value '1' to the road surface condition variation flag Fchange (step S174). In the event of the spin of the drive wheels 62*a* and 62*b* on the low $\mu$ road surface, the first peak appears immediately after the start of the wheelspin and the second peak is observed at the time of convergence of the wheelspin. In the case of no variation in road surface condition, the value of the second peak generally arising at the time of convergence of the wheelspin typically remains in a fixed range, although depending upon the road surface condition (the frictional coefficient) and the performances of the vehicle. In the case of a variation in road surface condition, that is, in the event of a change from the low $\mu$ road surface to the high $\mu$ road surface, the second peak angular acceleration $\alpha$2 at the time of convergence of the wheelspin exceeds the fixed range. When the second peak angular acceleration $\alpha$2 is not less than the threshold value $\alpha$ref, which is set to be greater than the ordinary allowable maximum value set to the first peak angular acceleration $\alpha$1 in the event of the occurrence of a slip due to the wheelspin, a variation in road surface condition (that is, a change from the low $\mu$ road surface to the high $\mu$ road surface) is estimated. The variation in road surface condition is also estimated when the second peak angular acceleration $\alpha$2 is less than the threshold value $\alpha$ref but is greater than the product of the first peak angular acceleration $\alpha$1 and the constant 'k'. Such detection is on the basis of the experimental result that the value of the second peak generally arising at the time of convergence of the wheelspin is usually not greater than the value of the first peak in the case of no variation in road surface condition.

Figure 8:
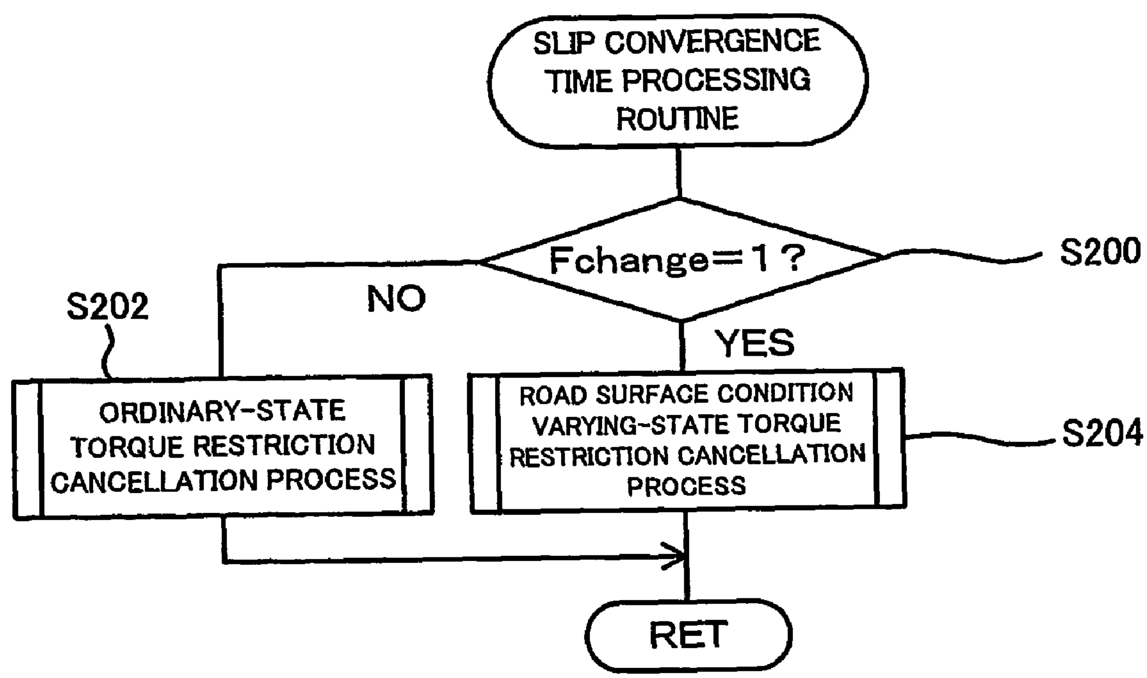
FIG. 8 is a flowchart showing a slip convergence time processing routine executed by the electronic control unit 70 in the vehicle 20 of the embodiment.

A slip convergence time processing routine shown in the flowchart of FIG. 8 is executed according to the result of the varying road surface condition estimation process of FIG. 7. When the slip convergence time processing routine starts, the CPU 72 of the main electronic control unit 70 first checks the value of the road surface condition variation flag Fchange (step S200). When the road surface condition variation flag Fchange is not equal 1, that is, in the event of estimation of no variation in road surface condition, the routine executes an ordinary-state torque restriction cancellation process shown in the flowchart of FIG. 9 (step S202). When the road surface condition variation flag Fchange is equal to 1, that is, in the event of estimation of a variation in road surface condition, on the other hand, the routine executes a road surface condition varying-state torque restriction cancellation process shown in the flowchart of FIG. 11 (step S204). The slip convergence time processing routine is then terminated. The description first regards the ordinary-state torque restriction cancellation process of FIG. 9 and then the road surface condition varying-state torque restriction cancellation process of FIG. 11.

Figure 10:
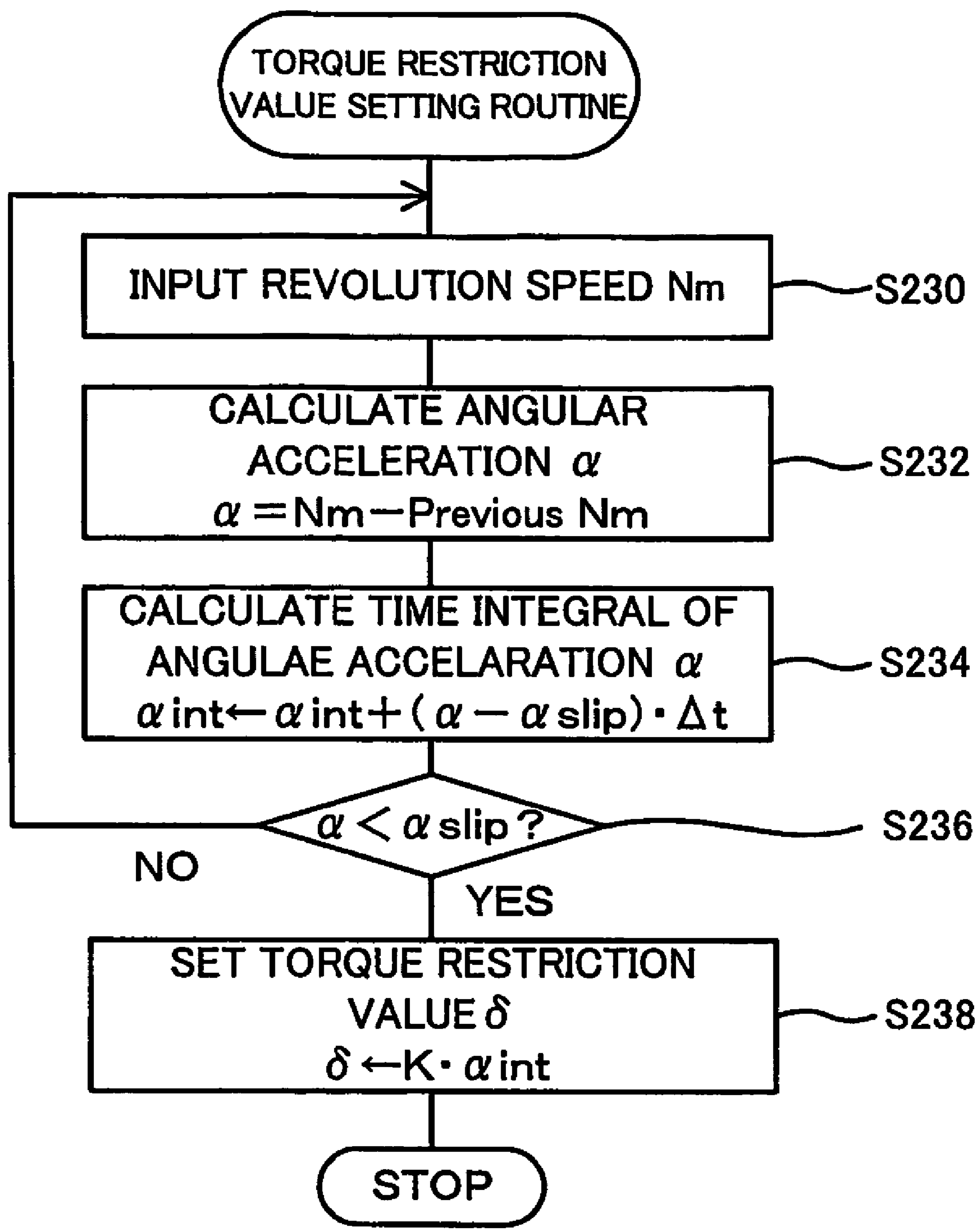
FIG. 10 is a flowchart showing a torque restriction value setting routine executed by the electronic control unit 70 in the vehicle 20 of the embodiment.

The ordinary-state torque restriction cancellation routine first checks the value of a torque restriction cancellation flag Fa (step S210). When the torque restriction cancellation flag Fa is equal to 0, the routine determines that the current cycle is a first cycle. The routine accordingly inputs a torque restriction value $\delta$ (expressed in the same unit 'rpm/8 msec' as that of the angular acceleration) (step S212) and sets the value '1' to the torque restriction cancellation flag Fa (step S214). Here the torque restriction value $\delta$ is a parameter used to raise the torque upper limit Tmax set corresponding to the peak value of the angular acceleration by the series of slip occurrence time processing and thereby to set a degree of cancellation of the torque restriction. The torque restriction value $\delta$ is set according to a torque restriction value setting routine of FIG. 10. The torque restriction value setting routine of FIG. 10 is executed, in response to setting of the value '1' to the slip occurrence flag F1 at step S122 in the slip state detection routine of FIG. 4, that is, when the angular acceleration α exceeds the threshold value αslip. The torque restriction value setting routine inputs the revolution speed Nm computed from the rotational position θm of the drive shaft 28 detected by the rotational position detection sensor 32, calculates the angular acceleration α from the inputs of the revolution speed Nm, and repeats calculation of a time integral αint of the angular acceleration α from a time point when the calculated angular acceleration α exceeds the threshold value αslip until the angular acceleration α becomes less than the threshold value αslip again (steps S230 to S236). In this embodiment, the time integral αint of the angular acceleration is calculated according to Equation (1) given below. In Equation (1), 'Δt' denotes a time interval of repeated execution of steps S230 through S236 in this routine and is set equal to 8 msec in this embodiment.

$$\alpha int \rightarrow \alpha int + (\alpha - \alpha slip) \cdot \Delta t \quad (1)$$

On conclusion of the calculation of the time integral αint when the angular acceleration α becomes less than the threshold value αslip again, the routine multiplies the calculated time integral αint by a preset coefficient K to set the torque restriction value δ corresponding to the time integral αint (step S238) and is then terminated. The procedure of this embodiment calculates the torque restriction value δ with the preset coefficient K. Another applicable procedure prepares a map showing a variation in torque restriction value δ against the time integral αint and reads and sets the torque restriction value δ corresponding to the calculated time integral αint from the map.

Figure 9:
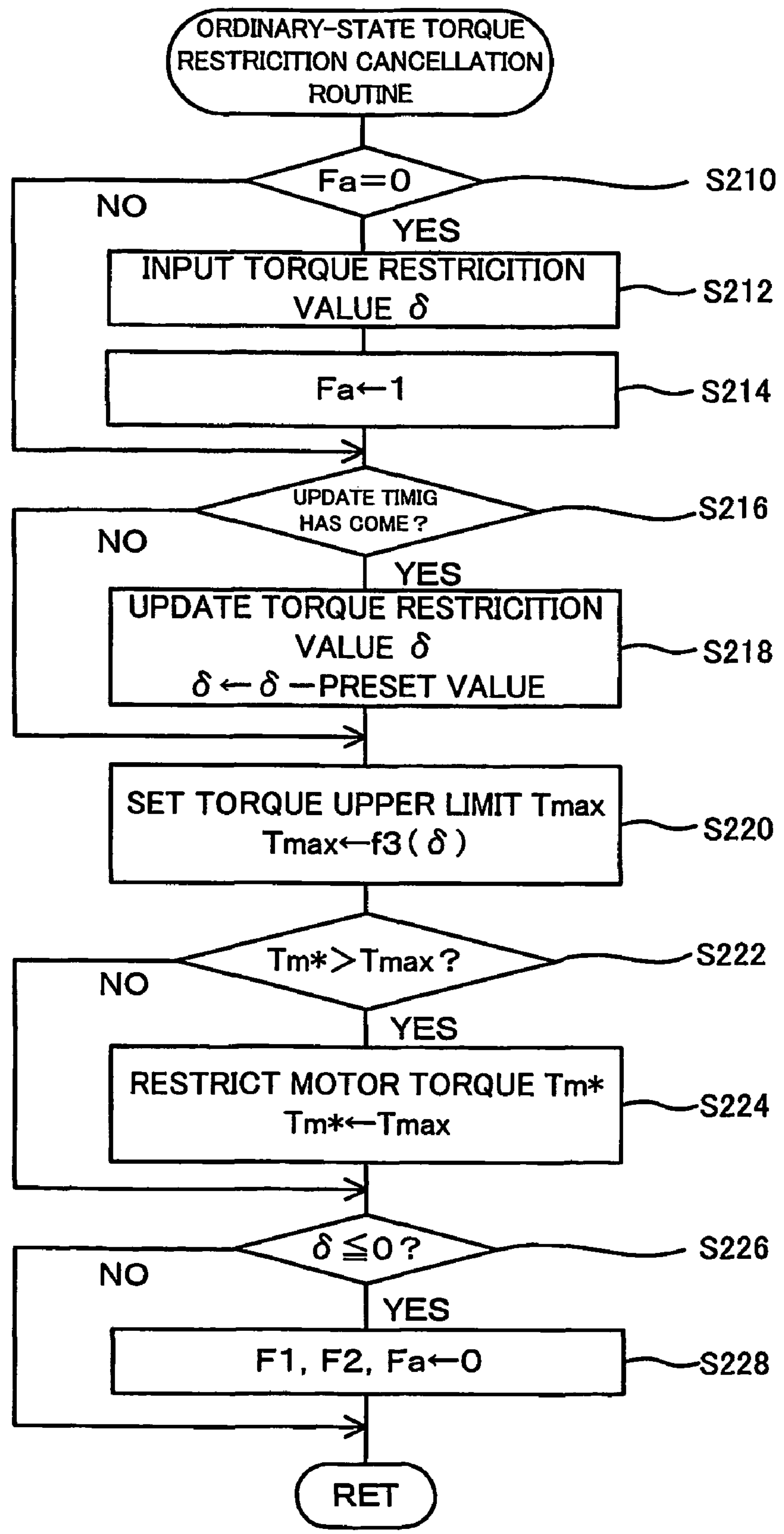
FIG. 9 is a flowchart showing an ordinary-state torque restriction cancellation routine executed by the electronic control unit 70 in the vehicle 20 of the embodiment.

Referring back to the flowchart of FIG. 9, after the input of the torque restriction value δ set as discussed above or in response to determination at step S210 that the torque restriction cancellation flag Fa is not equal to 0 (but is equal to 1), the ordinary-state torque restriction cancellation routine determines whether an update timing of the torque restriction value δ has come (step S216). When it is determined that the update timing has come, the routine subtracts a preset value from the torque restriction value δ to update and newly set the torque restriction value δ (step S218). This updating process raises the setting of the torque upper limit Tmax stepwise at every update timing after setting the torque upper limit Tmax at subsequent step S220 with the torque restriction value δ input at step S212, so as to gradually cancel the torque restriction. When it is determined that the update timing has not yet come, on the other hand, update of the torque restriction value δ is not implemented. The routine then sets the torque upper limit Tmax as the allowable upper limit of torque output from the motor 22, based on the torque restriction value δ according to the map of FIG. 6 (step S220). The routine then restricts the motor torque Tm* set at step S102 in the drive control routine of FIG. 2 with the setting of the torque upper limit Tmax (steps S222 and S224), and determines whether the torque restriction value δ becomes not greater than 0 (step S226). When the torque restriction value δ becomes not greater than 0, the routine sets the value '0' to the slip occurrence flag F1, the slip convergence flag F2 and the motor torque restriction cancellation flag Fa (step S228) and is then terminated. In this manner, the procedure of this embodiment sets the torque upper limit Tmax based on the torque restriction value δ calculated from the time-integral αint of the angular acceleration α and uses this torque upper limit Tmax to set the torque (initial torque) for starting cancellation of the restriction of the output torque to the drive shaft 28. Such torque control cancels the torque restriction by an adequate degree corresponding to the state of a slip, in response to the convergence of the slip, and thereby effectively prevents the re-occurrence of a slip without excess torque restriction.

Figure 11:
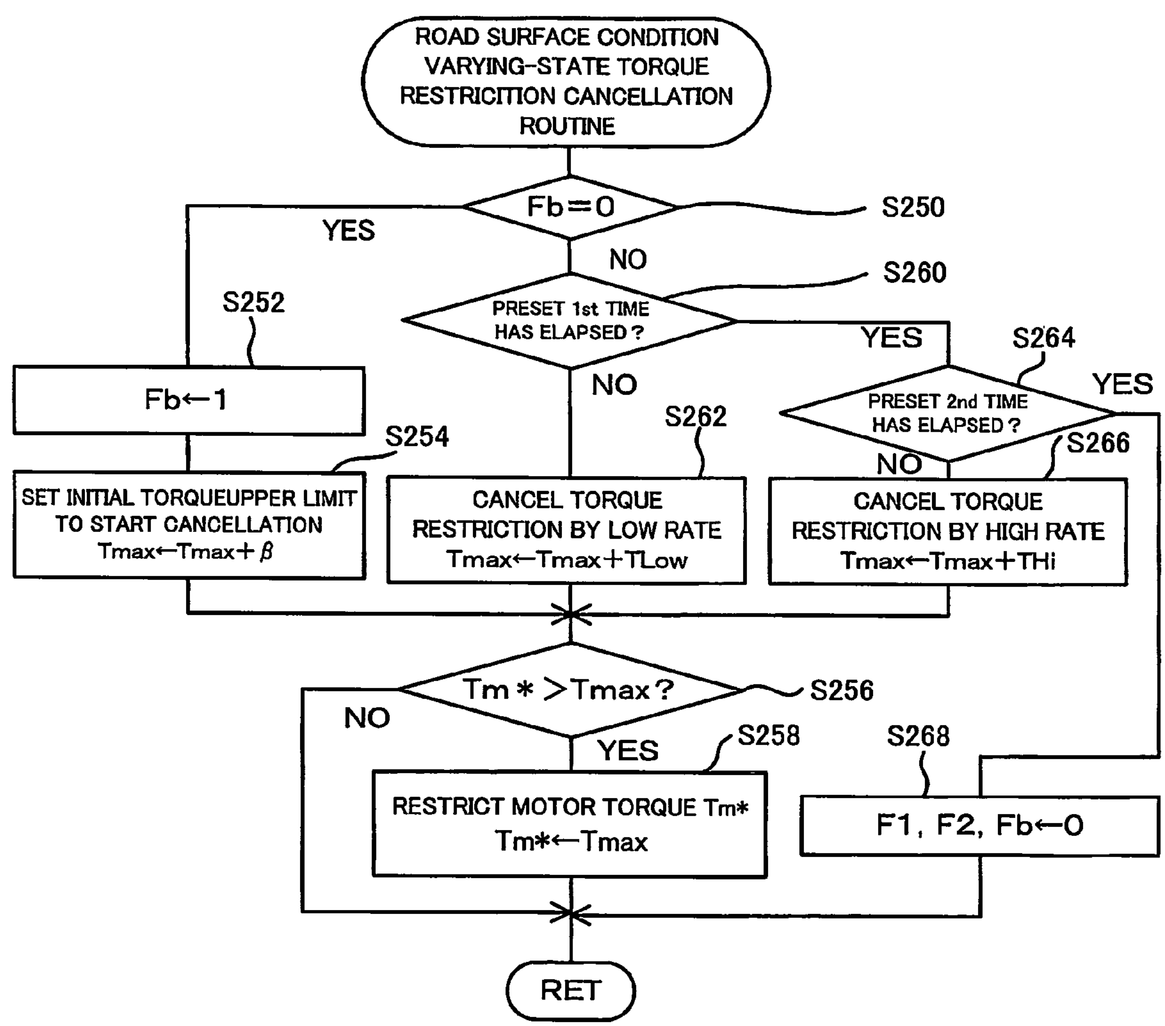
FIG. 11 is a flowchart showing a road surface condition varying-state torque restriction cancellation routine executed by the electronic control unit 70 in the vehicle 20 of the embodiment.

The following describes the road surface condition varying-state torque restriction cancellation process of FIG. 11 in response to estimation of a variation in road surface condition. The road surface condition varying-state restriction cancellation routine of FIG. 11 first checks the value of a torque restriction cancellation flag Fb (step S250). When the torque restriction cancellation flag Fb is equal to 0, the routine determines that the current cycle is a first cycle. The routine accordingly sets the value '1' to the torque restriction cancellation flag Fb and adds a predetermined value β to the torque upper limit Tmax corresponding to the peak value αpeak of the angular acceleration set at step S144 in the slip occurrence time processing routine of FIG. 5 to newly set the torque upper limit Tmax as the allowable upper limit of torque output from the motor 22 to start cancellation of the torque restriction (steps S252 and S254). Here the predetermined value β is experimentally determined to prevent the flow of excessive current through the motor 22 caused by a decrease in input voltage of the inverter circuit 24, which is accompanied with a delayed voltage increase by the DC/DC converter circuit 25 to start cancellation of the torque restriction. The predetermined value β maybe set, for example, in a range of 30 to 70 Nm (set equal to 50 Nm in this embodiment). After newly setting the torque upper limit Tmax, the routine restricts the motor torque Tm* set at step S102 in the drive control routine of FIG. 2 with the torque upper limit Tmax and thereby sets the initial torque for starting cancellation of the torque restriction (steps S256 and S258), before being terminated. A variation in road surface condition to increase the frictional coefficient on the road surface during a slip converges the slip in a relatively short time. The time integral αint of the angular acceleration α thus takes a small value. This decreases the torque restriction value δ set proportionally to the time integral αint of the angular acceleration α and sets a large value to the torque upper limit Tmax in the ordinary-state torque restriction cancellation process of FIG. 9. A relatively large value is accordingly set to the motor torque Tm* to be output from the motor 22. There is a possibility that the flow of excessive current is supplied to the motor 22 due to a delayed voltage increase by the DC/DC converter circuit 25. In the case of a variation in road surface condition during a slip, the road surface condition varying-state torque restriction cancellation process of FIG. 11 is executed, in place of the ordinary-state torque restriction cancellation process of FIG. 9, in order to prevent the potential supply of excessive current to the motor 22.

When it is determined at step S250 that the torque restriction cancellation flag Fb is equal to 1, the routine subsequently determines whether a preset first time has elapsed since the restriction of the motor torque Tm* with the torque upper limit Tmax set at step S254 (that is, since the start of cancellation of the torque restriction by the slip occurrence time processing routine of FIG. 5) (step S260). The routine repeatedly adds a predetermined value TLow to the torque upper limit Tmax and thereby updates the torque upper limit Tmax (step S262), until it is determined that the preset first time has elapsed. Here a small value is set to the predetermined value TLow to ensure a gentle time variation in torque upper limit Tmax. The preset first time is specified as a waiting time to stabilize the voltage-increase operation by the DC/DC converter circuit 25 and is, for example, in a range of 400 msec to 600 msec (is equal to 500 msec in this embodiment). When it is determined that the preset first time has elapsed, that is, it is determined that the waiting time to stabilize the voltage-increase operation of the DC/DC converter circuit 25 has elapsed, the routine repeatedly adds a predetermined value THi, which is greater than the predetermined value TLow, to the torque upper limit Tmax and thereby updates the torque upper limit Tmax to attain prompt cancellation of the torque restriction, until it is determined that a preset second time has elapsed (steps S264 and S266). After update of the torque upper limit Tmax, the routine restricts the motor torque Tm* with the update setting of the torque upper limit Tmax (step S258) and is then terminated. This arrangement attains prompt cancellation of the torque restriction in the state of convergence of a slip, while ensuring the stable voltage-increase operation of the DC/DC converter circuit 25. When it is determined at step S264 that the preset second time has elapsed, the routine sets the value '0' to the slip occurrence flag F1, the slip convergence flag F2, and the torque restriction cancellation flag Fb to completely cancel out the torque restriction (step S268), before being terminated.

Figure 12:
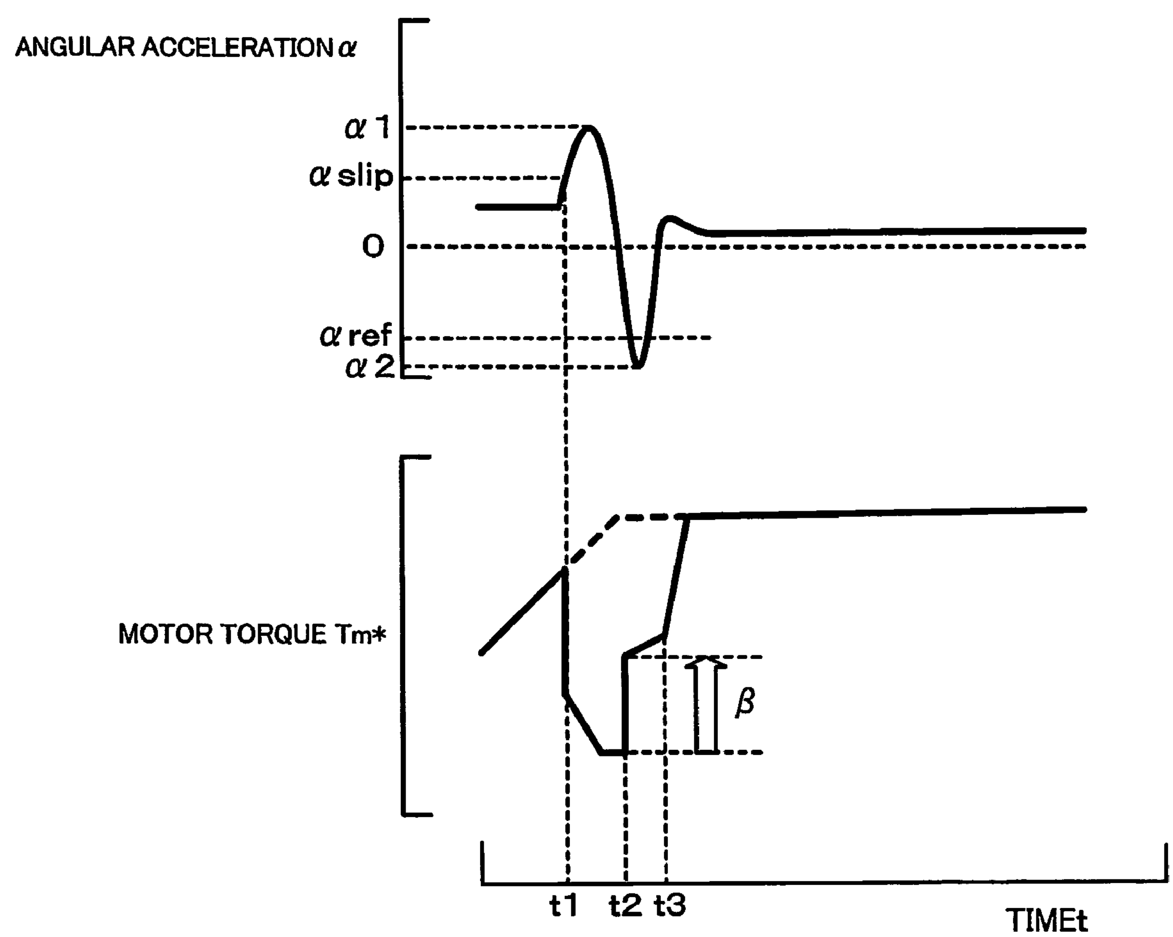
FIG. 12 shows time variations of the angular acceleration $\alpha$ and the motor torque Tm*, in response to a variation in road surface condition during a slip.

FIG. 12 shows time variations of the angular acceleration α and the motor torque Tm*, in response to a variation in road surface condition during a slip. As illustrated, in response to the occurrence of a slip at a time point t1, the torque upper limit Tmax corresponding to the peak value αpeak of the angular acceleration is set to restrict the output torque to the drive shaft 28. In this torque restriction state, a variation in road surface condition, that is, a change from the low μ road surface to the high μ road surface, causes the second peak angular acceleration α2 to be greater than the first peak angular acceleration α1 and, in some cases, to be greater than even the threshold value αref. In response to the convergence of the slip at a time point t2, the torque upper limit Tmax set at the time of the occurrence of the slip is raised by the predetermined value β to start cancellation of the torque restriction. The torque restriction is cancelled by a gentle slope until elapse of a preset time period (the time point t2 to a time point t3). This stabilizes the voltage-increase operation of the DC/DC converter circuit 25. At the time point t3 when the preset time period has elapsed and the voltage-increase operation of the DC/DC converter circuit 25 has been stabilized, the torque restriction is cancelled out promptly.

As described above, in response to an estimated variation in road surface condition during a slip, the vehicle 20 of the embodiment updates the torque upper limit Tmax by adding the predetermined value β to the torque upper limit Tmax, which has been set corresponding to the peak value αpeak of the angular acceleration at the time of the occurrence of a slip, and uses this update torque upper limit Tmax to start cancellation of the restriction of the output torque to the drive shaft 28. This arrangement desirably stabilizes the voltage-increase operation of the DC/DC converter circuit 25 and the supply of electric power to the motor 22, regardless of the torque restriction during a slip. The control procedure of the embodiment cancels the torque restriction by a gentle slope (restrains the degree of cancellation) until elapse of a preset time period, after cancellation of the torque restriction set in response to the occurrence of a slip by the predetermined value β. This ensures the stable voltage-increase operation of the DC/DC converter circuit 25. The torque restriction is promptly cancelled out after elapse of the preset time period.

In response to the convergence of a slip, the vehicle 20 of the embodiment updates the torque upper limit Tmax by adding the predetermined value β to the torque upper limit Tmax, which has been set corresponding to the peak value speak of the angular acceleration at the time of the occurrence of the slip, and uses this update torque upper limit Tmax to start cancellation of the restriction of the output torque to the drive shaft 28. The vehicle 20 then raises the torque upper limit Tmax by two different slopes of time change to completely cancel out the torque restriction. One modified procedure may raise the torque upper limit Tmax by three or a greater number of different slopes of time change to completely cancel out the torque restriction. Another modified procedure may update the torque upper limit Tmax by a fixed slope of time change.

In response to an estimated variation in road surface condition, the vehicle 20 of the embodiment adds the predetermined value β to the torque upper limit Tmax, which has been set corresponding to the peak value αpeak of the angular acceleration at the time of the occurrence of a slip, and thereby updates the torque upper limit Tmax used to start cancellation of the torque restriction (this means execution of the road surface condition varying-state torque restriction cancellation process of FIG. 11). One possible modification may specify a preset time period as a time required for convergence of a slip and execute a series of processing similar to the road surface condition varying-state torque restriction cancellation process of FIG. 11 until elapse of the preset time period. Another possible modification may execute a series of processing similar to the road surface condition varying-state torque restriction cancellation process of FIG. 11, regardless of the variation in road surface condition or the elapse of time for convergence of a slip.

Figure 13:
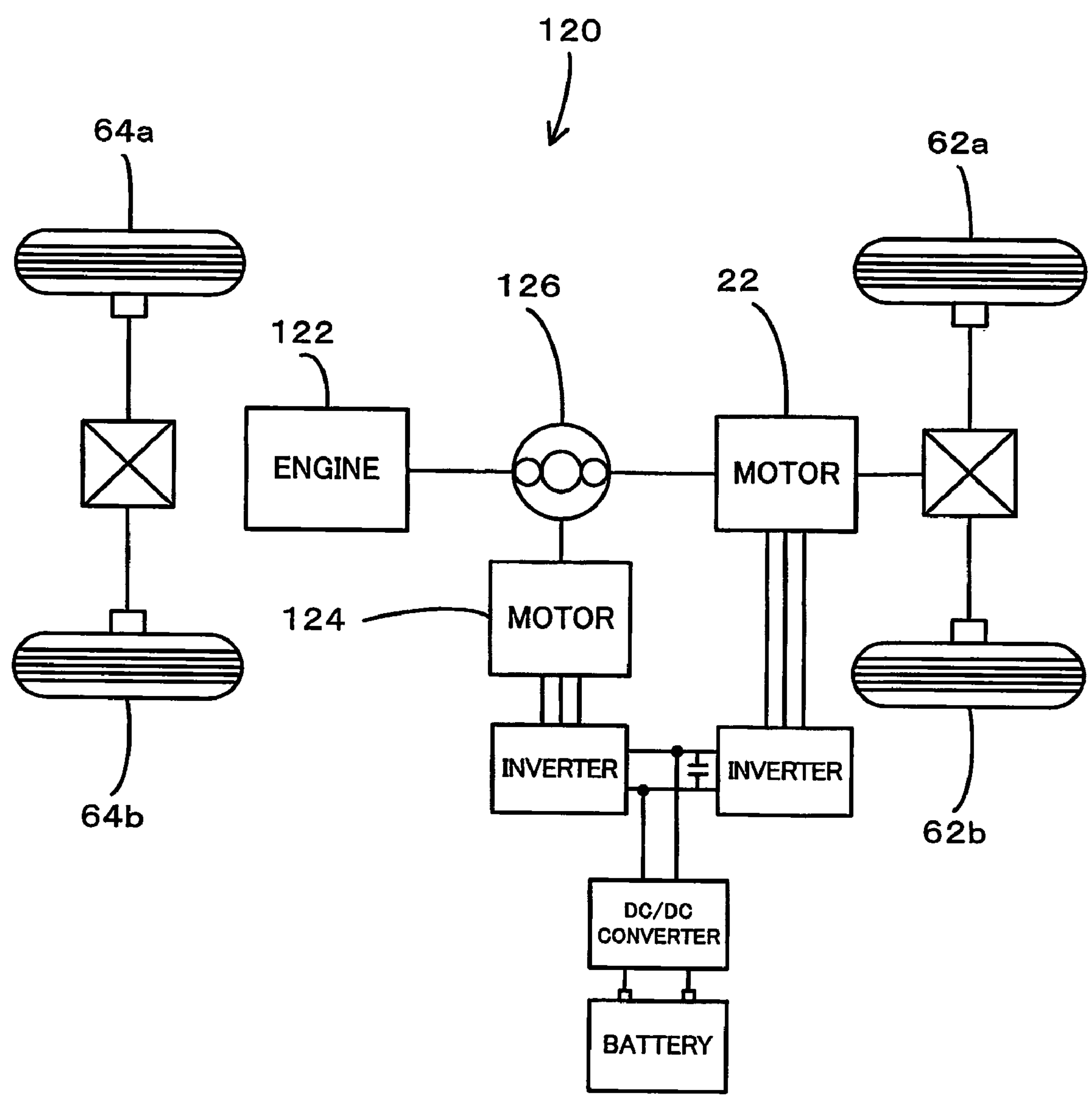
FIG. 13 schematically illustrates the configuration of a vehicle 120 in one modified example.
Figure 14:
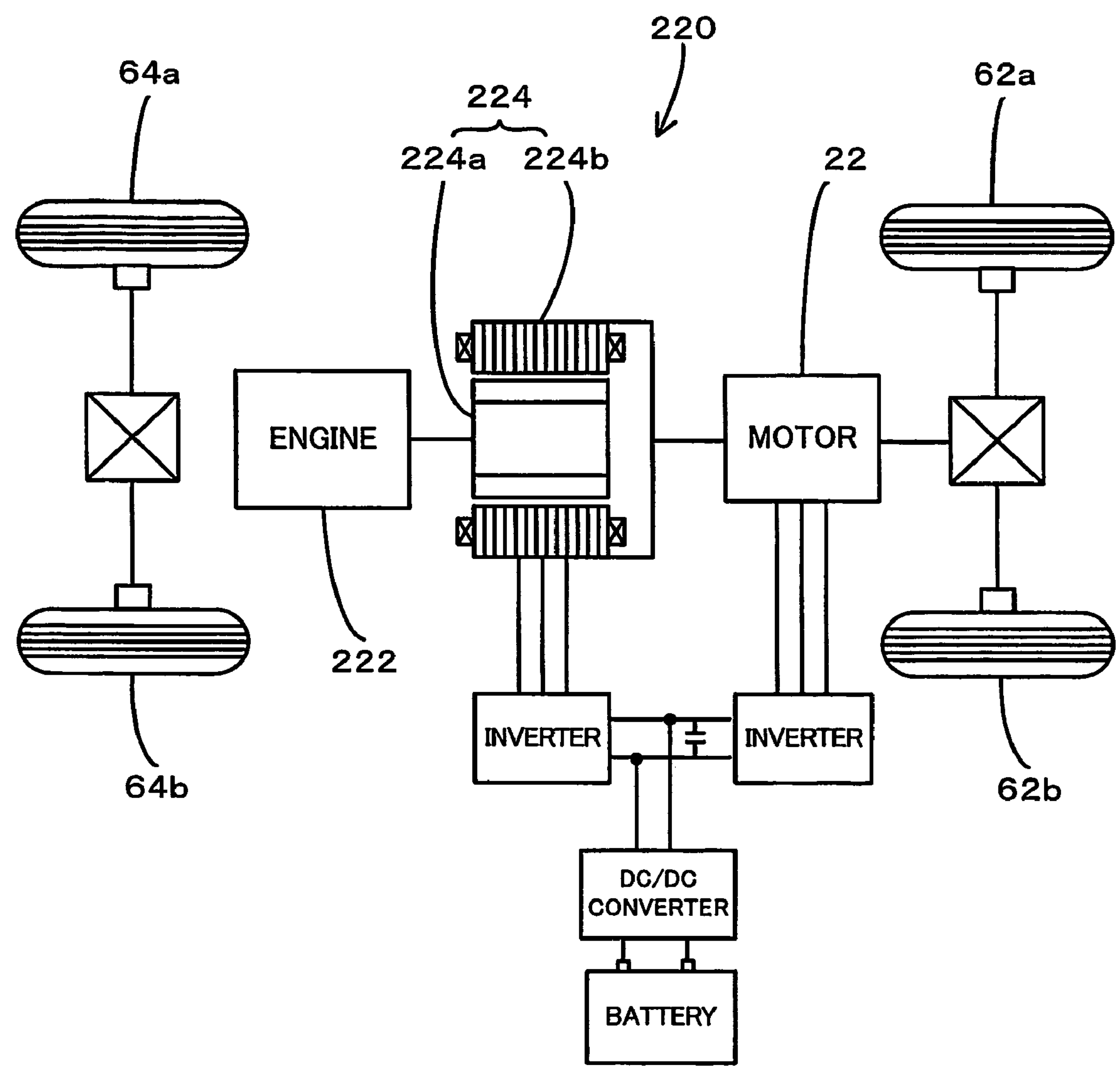
FIG. 14 schematically illustrates the configuration of a vehicle 220 in another modified example.
Figure 15:
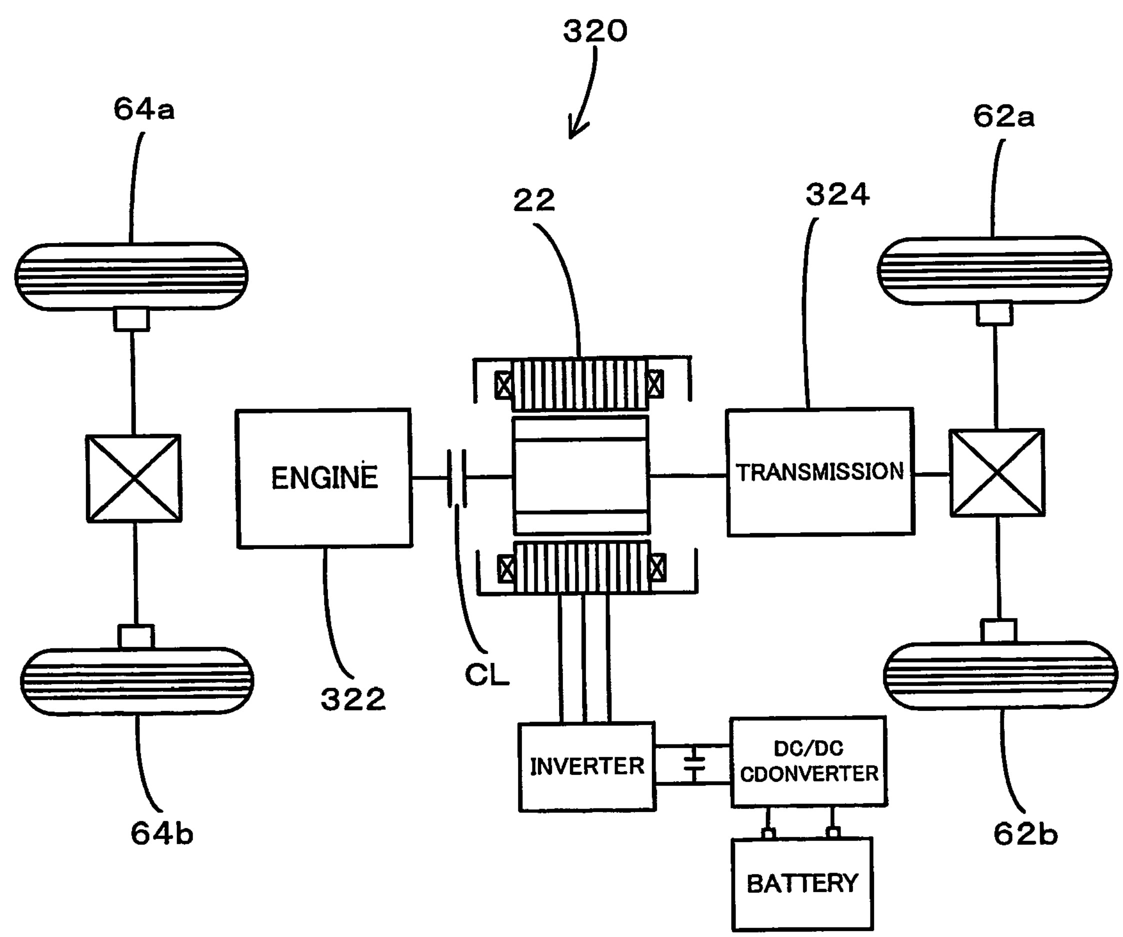
FIG. 15 schematically illustrates the configuration of a vehicle 320 in still another modified example.

The embodiment discussed above regards the vehicle 20 equipped with the motor 22 that is mechanically connected to directly output power to the drive shaft linked with the drive wheels 62*a* and 62*b*. The technique of the invention may be applied to any vehicle equipped with a motor that is capable of outputting power to a drive shaft. For example, the technique of the invention is applicable to a series hybrid vehicle including an engine, a generator that is linked with an output shaft of the engine, and a motor that utilizes a supply of electric power from the generator to output power to a drive shaft. The technique of the invention is also applicable to a mechanical distribution-type hybrid vehicle 120 of FIG. 13 including an engine 122, a planetary gear unit 126 that is linked with the engine 122, a motor 124 that is connected with the planetary gear unit 126 and generates electric power, and a motor 22 that is connected with the planetary gear unit 126 and is mechanically linked with a drive shaft connecting with drive wheels 62*a* and 62*b* to output power to the drive shaft. The technique is further applicable to an electrical distribution-type hybrid vehicle 220 of FIG. 14 including an engine 222, a motor 224 that has an inner rotor 224*a* linked with an output shaft of the engine 222 and an outer rotor 224*b* attached to a drive shaft connecting with drive wheels 62*a* and 62*b* and relatively rotates through electromagnetic functions of the inner rotor 224*a* to the outer rotor 224*b*, and a motor 22 that is mechanically linked with the drive shaft to output power to the drive shaft. The technique is also applicable to a hybrid vehicle 320 of FIG. 15 including a motor 22 that is linked via a transmission 324 (for example, a continuously variable transmission or an automatic step transmission) with a drive shaft connecting with drive wheels 62*a* and 62*b*, and an engine 322 that is linked with a rotating shaft of the motor 22 via a clutch CL. In the event of the occurrence of a slip on the drive wheels, the control procedure mainly controls the motor mechanically linked with the drive shaft by taking into account its quick output response and thereby restricts the torque output to the drive shaft. Control of another motor and control of the engine may be carried out in cooperation with the control of this motor.

The embodiment discussed above is to be considered in all aspects as illustrative and not restrictive. There may be many modifications, changes, and alterations without departing from the scope or spirit of the main characteristics of the present invention.

INDUSTRIAL APPLICABILITY

The technique of the invention is applicable to the industries relating to vehicles like automobiles and train cars.

The invention claimed is:

1. A vehicle that is driven with output of power to a drive shaft linked with drive wheels, said vehicle comprising:

a voltage converter that converts a voltage of an accumulator into a desired form of voltage;

a motor that receives a supply of electric power having the voltage converted by said voltage converter and outputs power to the drive shaft;

a slip detection module that detects a slip due to spin of the drive wheels; and a controller that, in response to detection of a slip by said slip detection module, drives and controls said motor to restrict a torque output to the drive shaft with a view to converging the detected slip, and sets an initial torque for starting cancellation of the restriction of the torque output to the drive shaft, based on the restriction of the torque output, said controller driving and controlling said motor, in response to convergence of the detected slip, to apply the setting of the initial torque and thereby cancel the restriction of the torque output to the drive shaft, wherein said controller drives and controls said motor to restrain a degree of the cancellation of the torque restriction for a preset time period, which represents a time required to stabilize the voltage-converting operation of said voltage converter, after cancellation of the restriction of the torque output to the drive shaft to a level of the initial torque, to cancel the restriction of the torque output to the to the drive shaft by a slope of a first time change until elapse of the preset time period and to cancel the torque restriction by a slope of a second time change, which is greater than the slope of the first time change, after elapse of the preset time period.

2. A vehicle in accordance with claim 1, wherein said controller sets a resulting torque, which cancels the restriction of the torque output to the drive shaft by a predetermined level, to the initial torque.

3. A vehicle in accordance with claim 1, said vehicle further comprising:

an angular acceleration measurement module that measures an angular acceleration of the drive shaft, wherein said controller drives and controls said motor to restrict the torque output to the drive shaft with a torque restriction value, which is set corresponding to a peak value of the measured angular acceleration in response to detection of a slip by said slip detection module, and sets the initial torque based on the torque restriction value.

4. A vehicle in accordance with claim 1, said vehicle further comprising:

an angular acceleration measurement module that measures an angular acceleration of the drive shaft, wherein said controller sets a second initial torque, which has a greater degree of cancellation of the torque restriction against a smaller value of time integral of the measured angular acceleration of the drive shaft in response to detection of a slip by said slip detection module, in the case of no convergence of the slip in the short time period, said controller driving and controlling said motor, in response to convergence of the detected slip, to apply the setting of the second initial torque and thereby cancel the restriction of the torque output to the drive shaft.

5. A vehicle in accordance with claim 1, said vehicle further comprising:

a varying road surface condition estimation module that estimates a variation in road surface condition, wherein said controller carries out control to apply the setting of the initial torque and thereby cancel the restriction of the torque output to the drive shaft, in response to estimation of a variation in road surface condition.

6. A vehicle in accordance with claim 5, said vehicle further comprising:

an angular acceleration measurement module that measures an angular acceleration of the drive shaft, wherein said controller sets a second initial torque, which has a greater degree of cancellation of the torque restriction against a smaller value of time integral of the measured angular acceleration of the drive shaft in response to detection of a slip by said slip detection module, in the case of estimation of no variation in road surface condition, said controller driving and controlling said motor, in response to convergence of the detected slip, to apply the setting of the second initial torque and thereby cancel the restriction of the torque output to the drive shaft.

7. A control method of a vehicle equipped with a voltage converter that converts a voltage of an accumulator into a desired form of voltage and with a motor that receives a supply of electric power having the converted voltage and outputs power to a drive shaft linked with drive wheels, said control method comprising the steps of:

(a) detecting a slip due to spin of the drive wheels;

(b) in response to detection of a slip in said step (a), driving and controlling said motor to restrict a torque output to the drive shaft with a view to converging the detected slip;

(c) setting an initial torque for starting cancellation of the restriction of the torque output, based on the restriction of the torque output in said step (b); and (d) driving and controlling said motor, in response to convergence of the slip detected in said step (a), to apply the initial torque set in said step (c) and thereby cancel the restriction of the torque output to the drive shaft and driving and controlling said motor to restrain a degree of the cancellation of the torque restriction for a preset time period, which represents a time required to stabilize the voltage-converting operation of said voltage converter, after cancellation of the restriction of the torque output to the drive shaft to a level of the initial torque, to cancel the restriction of the torque output to the to the drive shaft by a slope of a first time change until elapse of the preset time period and to cancel the torque restriction by a slope of a second time change, which is greater than the slope of the first time change, after elapse of the preset time period.

* * * * *

UNITED STATES PATENT AND TRADEMARK OFFICE

CERTIFICATE OF CORRECTION

PATENT NO. : 7,500,534 B2
APPLICATION NO. : 10/565851
DATED : March 10, 2009
INVENTOR(S) : Akira Hommi It is certified that error appears in the above-identified patent and that said Letters Patent is hereby corrected as shown below:

| **Column** | **Line** | |
|---|---|---|
| 6 | 24 | Change “speak” to --αpeak--. |
| 9 | 21-22 | Change “αint→αint+(α-αslip)·Δt” to --αint←αint+(α-αslip)·Δt--. |
| 11 | 67 | Change “speak” to --αpeak--. |

Signed and Sealed this

Eleventh Day of August, 2009

David J. Kappos

David J. Kappos
*Director of the United States Patent and Trademark Office*